US011270292B2

(12) United States Patent
Milne

(10) Patent No.: US 11,270,292 B2
(45) Date of Patent: Mar. 8, 2022

(54) KEY PAIR AUTHENTICATION IN A LABEL TRACKING SYSTEM

(71) Applicant: Dwolla, Inc., Des Moines, IA (US)

(72) Inventor: Benjamin P. Milne, Des Moines, IA (US)

(73) Assignee: DWOLLA, INC., Des Moines, IA (US)

( * ) Notice: Subject to any disclaimer, the term of this patent is extended or adjusted under 35 U.S.C. 154(b) by 0 days.

(21) Appl. No.: 16/860,618

(22) Filed: Apr. 28, 2020

(65) Prior Publication Data

US 2021/0334787 A1  Oct. 28, 2021

(51) Int. Cl.
*G06Q 20/36* (2012.01)
*G06F 16/9035* (2019.01)
*G06F 16/957* (2019.01)
*G06Q 30/00* (2012.01)
*G06N 20/00* (2019.01)

(52) U.S. Cl.
CPC ....... *G06Q 20/363* (2013.01); *G06F 16/9035* (2019.01); *G06F 16/957* (2019.01); *G06Q 20/367* (2013.01); *G06Q 30/016* (2013.01); *G06N 20/00* (2019.01)

(58) Field of Classification Search
CPC .. G06Q 20/363; G06Q 20/367; G06Q 30/016; G06F 16/957; G06F 16/9035
USPC .......................................................... 705/44
See application file for complete search history.

(56) References Cited

U.S. PATENT DOCUMENTS

| 2003/0004946 | A1  | 1/2003 | VanDenAvond |
|---|---|---|---|
| 2009/0171805 | A1* | 7/2009 | Gould ............... G06Q 30/0601 705/26.1 |
| 2010/0180339 | A1  | 7/2010 | Finlayson |
| 2011/0010253 | A1* | 1/2011 | Chenot ............... G06Q 20/347 705/17 |
| 2011/0010294 | A1* | 1/2011 | Chenot ............... G06Q 30/06 705/40 |

(Continued)

OTHER PUBLICATIONS

First Data Corporation Granted United States Patent for Systems and Methods Providng Multiple Account Holder Functionality. Global IP News. Business and Commerce Patent News; New Delhi. Jun. 28, 2014. (Year: 2014).*

(Continued)

*Primary Examiner* — Sara C Hamilton
(74) *Attorney, Agent, or Firm* — Hickman Becker Bingham Ledesma LLP

(57) ABSTRACT

Systems and method for method for providing account access to software applications are described herein. In an embodiment, a label tracking system stores a verified customer record comprising an identifier of an account owner and data describing items in an account of the account owner. The label tracking system further stores, for the verified customer record, data identifying a plurality of labels, each of the plurality of labels comprising an allocation of items in the account. When the label tracking system receives a request to access a particular label from a software application executing on a client computing device, the label tracking system determines, from authentication data provided in the request, that the software application is authorized to access the particular label and, in response, grants the software application exclusive access to allocate items from the particular label of the plurality of labels.

18 Claims, 6 Drawing Sheets

(56) References Cited

U.S. PATENT DOCUMENTS

| | | | |
|---|---|---|---|
| 2011/0087592 A1* | 4/2011 | van der Veen | G06Q 20/227 |
| | | | 705/44 |
| 2011/0125645 A1* | 5/2011 | Benkert | G06Q 20/10 |
| | | | 705/44 |
| 2012/0198437 A1 | 8/2012 | Kotamarthi | |
| 2012/0278235 A1* | 11/2012 | Kitchel | G06Q 40/02 |
| | | | 705/44 |
| 2013/0041743 A1 | 2/2013 | Coppinger | |
| 2016/0267466 A1 | 9/2016 | Kumnick | |
| 2016/0342992 A1* | 11/2016 | Lee | G06Q 30/06 |
| 2018/0005229 A1* | 1/2018 | Grassadonia | G06Q 20/3221 |
| 2018/0158057 A1* | 6/2018 | Kirch | G06Q 20/401 |
| 2020/0296080 A1* | 9/2020 | Milne | H04L 63/0421 |
| 2020/0356989 A1* | 11/2020 | Shamai | H04L 9/0662 |

OTHER PUBLICATIONS

International Searching Authority, "Search Report", in Application No. PCT/US2021/027781, dated Jul. 23, 2021, 14 pages.
Caza et al., "From Synchronizing to Harmonizing: The Process of Authenticating Multiple Work Identities", sagepub.com, Administrative Science Quarterly, vol. 63(4), Year 2018, 43 pages.

* cited by examiner

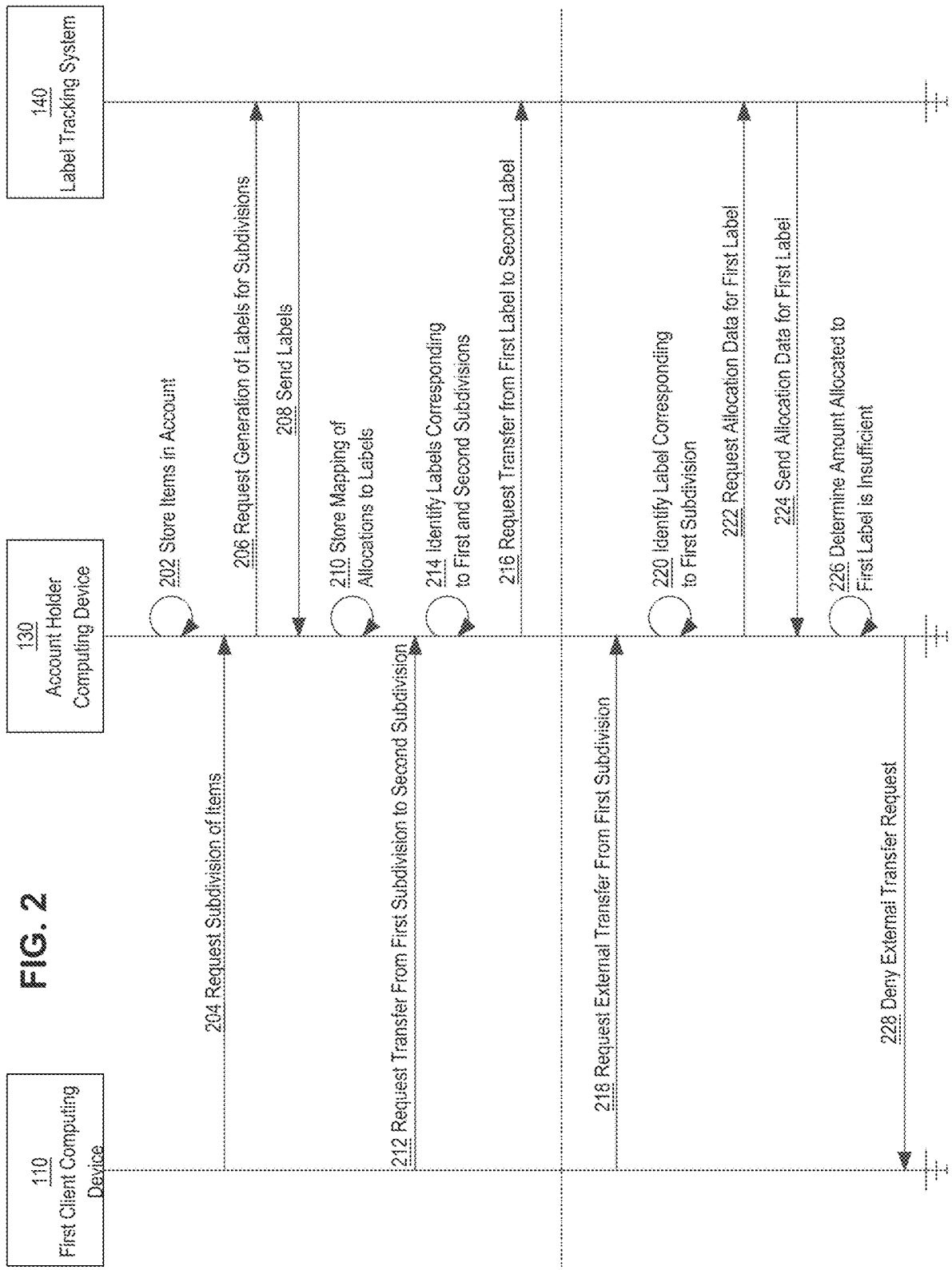

KEY PAIR AUTHENTICATION IN A LABEL TRACKING SYSTEM

FIELD OF THE DISCLOSURE

The present disclosure relates to authentication procedures utilizing systems for maintaining security and anonymity in digital electronic transfers.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

Security in digital electronic transfer systems is a huge problem modernly. Many digitally banking systems act as a single point in failure. Often, digital banking systems store personal information of account holders, balances of each account, and data required to perform transfers from the accounts. Thus, a single breach of security into a system would allow a user to access an account, determine how much is capable of being spent from the account, and initiate a transfer from the account.

Fund transfer applications often add another possible layer of vulnerability. When a user activates a fund transfer application, the user is often required to provide personal information, such as a name and billing address, along with account information, such as an account number or routing number of a bank account. Additionally, fund transfer applications often require download of a specialized application to utilize, thereby increasing memory constraints on devices of users that wish to utilize such applications.

Another issue with modern applications is that they require authorization of a user that is able to own money. Funds are kept in an account corresponding to the user thus, the user must be authenticated as a person who is capable of owning funds. Aside from security risks involved in authentication, the requirement for user authentication can create an immense lag time in application generation. Unfortunately, a software application, which could initiate and complete transactions at considerably improved speeds and on behalf of entities which cannot own funds, such as machines or young children, cannot be authenticated as an owner of funds.

Thus, there is a need for a system which increases security in computer-based transactions and which provide software applications the ability to access and utilize funds in an account.

SUMMARY

The appended claims may serve as a summary of the disclosure.

BRIEF DESCRIPTION OF THE DRAWINGS

In the drawings:

FIG. 2 depicts an example method for providing transfer facilitation.

DETAILED DESCRIPTION

Figure 1A:
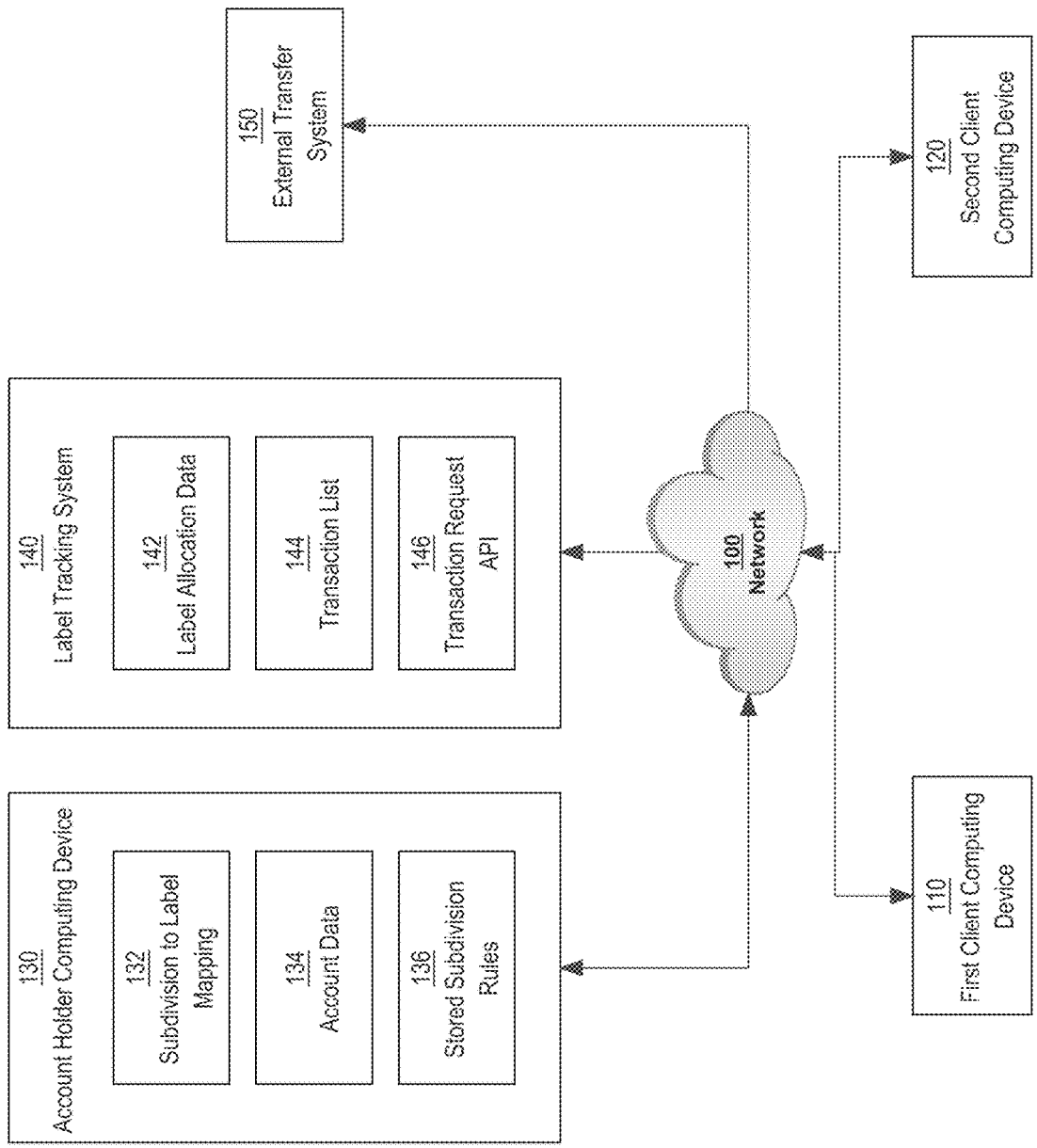
FIG. 1a depicts an example system on which example embodiments may be performed.

In the following description, for the purposes of explanation, numerous specific details are set forth in order to provide a thorough understanding of the disclosure. It will be apparent, however, that embodiments may be practiced without these specific details. In other instances, well-known structures and devices are shown in block diagram form in order to avoid unnecessarily obscuring the present disclosure.

General Overview

Systems and methods for providing access to items of an account are described herein. In an embodiment, a label tracking system maintains a label architecture. The label architecture includes a verified customer record corresponding to an account managed by an account holding computing device. The label tracking system stores data identifying allocations of items in the account to a plurality of labels. Authentication information for a particular label of the plurality of labels is provided to a software application which the software application uses to authenticate a right to access the particular label. When the software application sends a request to access the particular label, the label tracking system authenticates the authentication data provided by the software application and grants the software application write access to the label. Thus, the software application can send transfer requests to the label tracking system, causing the label tracking system to allocate items from the particular label to a different label without performing a funds transfer or requiring the software application or user of the software application to own the items in the account.

In an embodiment, a method for increasing security in online transfers by maintaining anonymity of transferors comprises receiving, at a label tracking system, a request to generate labels for an account of an account holder; generating a plurality of labels for the account, wherein the plurality of labels includes a first label and a second label; sending the plurality of labels to an account computing device, wherein the account computing device stores a mapping of labels to identification information; receiving an allocation request for allocating a first portion of items in the account to the first label and for allocating a second portion of the items in the account to the second label; in response to the allocation request, storing label allocation data that indicates the first portion of items are allocated to the first label, and the second portion of items are allocated to the second label; receiving a request to transfer a third portion of items from the first label to the second label; without changing items in the account, and without receiving identification information corresponding to the first label or the second label, updating the label allocation data to: decrement the items allocated to the first label by the third portion, and increment the items allocated to the second label by the third portion.

In an embodiment, a method for utilize a separate system for tracking item allocations in a manner that increases security and maintains anonymity of transferors comprises storing one or more items in an account of an account holder; receiving a request to generate a plurality of subdivisions of the account, each of the plurality of subdivisions corresponding to identifying information; sending, to a label tracking system, a request to generate labels for the one or more items; receiving, from the label tracking system, a plurality of labels; generating and storing a mapping of the plurality of labels to the subdivisions corresponding to identifying information; receiving a request to allocate a first portion of the one or more items to a first subdivision and a second portion of the one or more items to a second subdivision; identifying a first label of the plurality of labels as corresponding to the first subdivision and a second label of the plurality of labels as corresponding to the second subdivision in the mapping; sending, to the label tracking system, allocation data allocating the first portion of the one or more items to the first label and a second portion of the one or more items to the second label; receiving a request to transfer a third portion of the one or more items from the first subdivision to the second subdivision; identifying the first label as corresponding to the first subdivision and the second label as corresponding to the second subdivision in the mapping; sending, to the label tracking system, a request to transfer the third portion of the one or more items from the first label to the second label.

In an embodiment, a method comprises storing, at a label tracking system, a verified customer record comprising an identifier of an account owner and data describing items in an account of the account owner; storing, for the verified customer record, data identifying a plurality of labels, each of the plurality of labels comprising an allocation of items in the account; receiving, from a software application executing on a client computing device, a request to access a particular label of the plurality of labels, the request comprising unique authentication data; determining that the software application is authorized to access the particular label of the plurality of labels based on the unique authentication data; based on determining that the software application is authorized to access the particular label, granting the software application exclusive access to allocate items from the particular label of the plurality of labels.

System Overview

FIG. 1a depicts an example system on which example embodiments may be performed. In an embodiment, a first client computing device 110, a second client computing device 120, an account holder computing device 130, a label tracking system 140, and an external transfer system 150 communicate over network 100. Network 100 broadly represents any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1a. The various elements of FIG. 1a may also have direct (wired or wireless) communications links. The first client computing device 110, second client computing device 120, account holder computing device 130, label tracking system 140, and external transfer system 150, and other elements of the system may each comprise an interface compatible with the network 100 and are programmed or configured to use standardized protocols for communication across the networks such as TCP/IP, Bluetooth, and higher-layer protocols such as HTTP, TLS, and the like.

Each of the first client computing device 110 and the second client computing device 120 is a computer that includes hardware capable of communicatively coupling the devices to one or more server computers, such as label tracking system 140 over one or more service providers. For example, sending the first client computing device 110 may include a network card that communicates with label tracking system 140 through a home or office wireless router (not illustrated in FIG. 1) coupled to an internet service provider. Each of the first client computing device 110 and the second client computing device 120 may be a smart phone, personal computer, tablet computing device, PDAs, laptop, or any other computing device capable of transmitting and receiving information and performing the functions described herein.

The account holder computing device 130, label tracking system 140, and externally transfer system 150 may be implemented using server-class computers or other computers having one or more processor cores, co-processors, or other computers. The account holder computing device 130, label tracking system 140, and/or external transfer system 150 may be physical server computers and/or virtual server instances stored in a data center, such as through cloud computing.

In an embodiment, the account holder computer device 130 comprises subdivision to label mapping 132, account data 134, and stored subdivision rules 136. Subdivision to label mapping 132 comprises a stored mapping between identified subdivisions, such as user identifiers or account subdivision identifiers, and labels created by the label tracking system 140. Account data 134 comprises stored information regarding a particular account, such as items stored in the account and any protected information required to generate the account, such as social security numbers, full names, account addresses, or other identifying information. The account holder computing device 130 may store a mapping and account data for each account. Stored subdivision rules 136 comprise a set of optionally stored rules relating to specific subdivisions, such as minimal balances and maximum expenditures.

In an embodiment, label tracking system 140 comprises label allocation data 142, transaction list 144, and a transaction request application programming interface (API) endpoint 146. The label allocation data 142 comprises one or more data records which indicate, for a specific account, a number of items that correspond to each of a plurality of generated labels. The transaction list 144 comprises a list of transactions between different labels and/or between labels and external accounts. The label tracking system 140 may be configured to manage and update label allocation data 142 and/or the transaction list 144 in response to receiving a query through the transaction request API endpoint 146 identifying one or more labels and allocation and/or transfer data.

External transfer system 150 comprises an entity separate from the account holder computing device and label tracking system which receives requests for performing transactions from one or more client computing devices and verifies transactions through the label tracking system 140 and/or the account holder computing device. For example, the external transfer system 150 may provide a transfer application to a client computing device through which the client computing device can initiate a transfer. The external transfer system may store data identifying one or more labels for the client computing device and/or an additional subdivision to label mapping, thereby allowing the external transfer system to initiate and complete transactions in a similar manner as the account holder computing device.

For purposes of illustrating a clear example, FIG. 1a shows a limited number of instances of certain functional elements. However, in other embodiments, there may be any number of such elements. For example, embodiments may use thousands or millions of different client computing devices associated with different users. Further, the account holder computing device 130 and label tracking system 140 may be implemented using two or more processors, cores, clusters, or instances of physical machines or virtual machines, configured in a discrete location or co-located with other elements in a datacenter, shared computing facility or cloud computing facility.

Secure Label Access System Overview

Figure 1B:
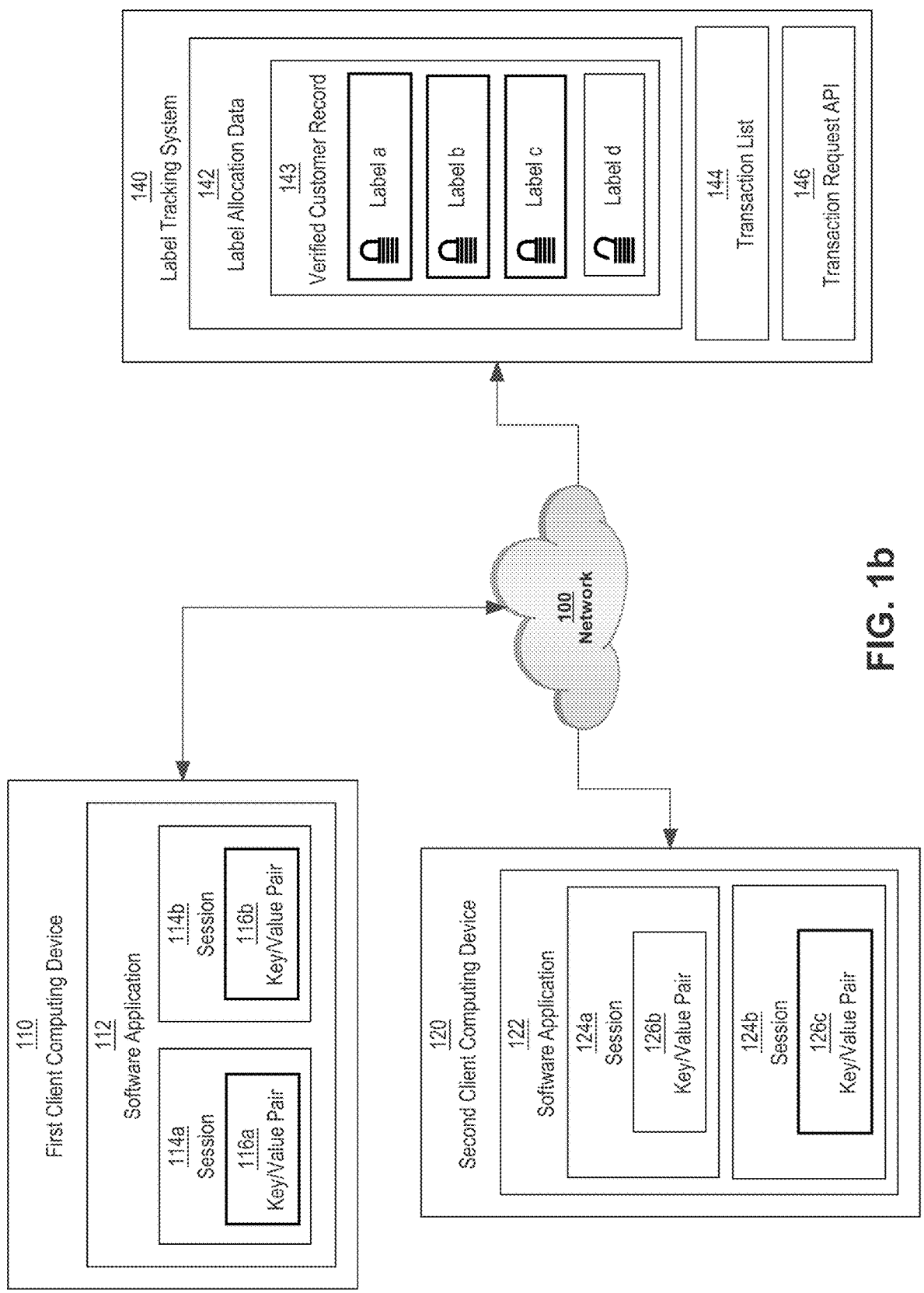
FIG. 1b depicts an example system providing secure access to one or labels.

FIG. 1b depicts an example system providing secure access to one or labels. In FIG. 1b, first client computing device 110 and second client computing device 210 communicate with label tracking system 140 over network 100 in order to access and allocate from one or more labels.

The label allocation data 142 of the label tracking system 140 comprises a verified customer record 143. Verified customer record 143 comprises allocation data for an owner of a particular account managed by an account holder computing device such as account holder computing device 130. Verified customer record 143 may be verified as corresponding to a particular person or entity that owns the items allocated by labels a-d in the verified customer record 143. Thus, a verified customer record 143 may include an identifier of an account, an identifier of an owner of the account, one or more label identifiers, and data identifying how much of the one or more items in the account are allocated to each label.

Label allocation data 142 in FIG. 1b includes labels a-d. Each of labels a-d comprise a label identifier and an allocation of items to the label. Labels a-d may additionally comprise authentication data used to authenticate access to the label from an external computing device. While labels a-d are depicted as separate entities, in an embodiment label allocation data is stored in the verified customer record 143 and authentication data is stored separately. Labels a-d are thus depicted in FIG. 1b to provide a clear example of how different applications may be authorized to allocate from particular labels.

In FIG. 1b first client computing device 110 executes software application 112. Software application 112 may be any software application which can communicate with label tracking system 140 over network 100. As an example, software application 112 may comprise a web browser executing on a client computing device which accesses label allocations for a verified customer record corresponding to an entity which provides and/or manages the web browser. As another example, the application may be a payment application executing on a mobile device which access allocations for a verified customer record corresponding to an entity which provides and/or manages the payment application.

Software application 112 comprises session 114a and session 114b. The sessions 114 may include different instantiations of the software application, such as different windows, add-ons, web services, or other applications being accessed by the software application 112. For example, session 114a may correspond to an online game while session 114b corresponds to a shopping application. Session 114a has access to key/value pair 116a stored on first client computing device 110 and/or provided through user input which corresponds to label a. Session 114b has access to key/value pair 116b stored on first client computing device 110 and/or provided through user input which corresponds to label b. For example, the software application 112 may receive user input authorizing session 114a to access key/value pair 116a.

Key/value pair 116a and key/value pair 116b comprise unique sets of authentication data for one or more labels. While FIG. 1b depicts key/value pairs 116 and 116b, other unique sets of authentication data may be used, such as unique encrypted tokens. In an embodiment, the key/value pairs are secure shell (SSH) public/private key/value pairs. While FIG. 1b depicts each key/value pair corresponding to a single label, in an embodiment a key/value pair may correspond to a plurality of labels.

Second client computing device 120 executes software application 122. Software application 122 may be any software application which can communicate with label tracking system 140 over network 100. As an example, software application 122 may comprise a web browser executing on a client computing device which accesses label allocations for a verified customer record corresponding to an entity which provides and/or manages the web browser. As another example, the application may be a payment application executing on a mobile device which access allocations for a verified customer record corresponding to an entity which provides and/or manages the payment application. In an embodiment, software application 122 and software application 112 are different instances of a same application, such as a same browser executing on different computing devices. Alternatively, software application 122 and software application 112 may be different applications managed and/or provided by the owner of the particular account corresponding to the VCR.

Software application 122 comprises session 124b and session 124b. The sessions 124 may include different instantiations of the software application, such as different windows, add-ons, web services, or other applications being accessed by the software application 122. For example, session 124b may correspond to an advertisement application while 124c corresponds to an email application. Session 124a has access to key/value pair 126b stored on second client computing device 120 and/or provided through user input which corresponds to label b. Session 124b has access to key/value pair 126c stored on second client computing device 120 and/or provided through user input which corresponds to label c. For example, the software application 122 may receive user input authorizing session 124b to access key/value pair 126c.

In an embodiment, key/value pair 116a comprises authentication data for accessing label a, key/value pair 116b and key/value pair 126b both comprise authentication data for accessing label b, and key/value pair 126c comprises authentication data for accessing label c. Thus, application 112 and application 122 may both send requests to label tracking system 140 to allocate items from label b. Label tracking system 140 may block concurrent access to label b. Thus, while key/value pair 116b is bolded to show that session 114b is using key/value pair 116b to access label b, key/value pair 126b is not bolded to show that session 124a is not able to use key/value pair 126b to access label b.

Label Storage

FIG. 2 depicts an example method for providing transfer facilitation. The method of FIG. 2 allows security to be maintained during a transfer while providing extended transfer capabilities through a computing system.

At step 202, the account holder computing device 130 stores items in an account. The items may refer to any set of non-unique items, including physical items, such as goods or currency, and digital electronic items, such cryptocurrency or other virtual currency. In an embodiment, the account holder computing device stores the items on behalf of one or more other client computing devices. For example, items stored at the account holder computing device 130 may be owned by a user of the first client computing device 110 or the second client computing device 120.

At step 204, the account holder computing device 130 receives a request for a subdivision of the items stored in the account from the first client computing device 110. For example, the account holder computing device 130 may store the items in a particular account on behalf of a user of the first client computing device 110. The first client computing device 110 may send a request to the account holder computing device 130 to subdivide the account into a plurality of subdivisions.

In an embodiment, the plurality of subdivisions corresponds to a plurality of different people with different access rights and/or devices. For example, a first subdivision may be generated for an owner of the account while a second subdivision is generated for a relative of the owner of the account. Subdivisions may also correspond to different purposes, such as a necessities fund and a vacation fund.

In an embodiment, the subdivisions correspond to one or more rules. For example, a particular subdivision may correspond to a minimum balance rule which indicates a minimum amount of the item that must be stored in the first subdivision. Rules may also relate to who is allowed to access the subdivision, who is allowed to transfer to or from the subdivision, where funds from the subdivision may be spent, when funds from the subdivision may be spent, and/or any other rules relating to the balance and/or use of items in the subdivision.

At step 206, the account holder computing device 130 requests generation of labels for the subdivisions from the label tracking system 140. For example, the account holder computing device 130 may store data identifying each of the subdivisions. The account holder may send a request to the label tracking system 140 to generate a label for each of the subdivisions.

In an embodiment, the account holder computing device 130 does not identify the subdivisions to the label tracking system. For instance, instead of requesting subdivisions for four specific users, the account holder computing device 130 may send a request to the label tracking system which merely identifies an account and requests the generation of four labels for the account. Thus, the label tracking system 140 may not receive any data identifying the owner of the items or any of the uses of the subdivisions. In an embodiment, the account holder computing device 130 additionally requests a label for the account. Thus, when initially implementing the method, the account holder computing device 130 may request a label by which to identify the account. The account holder computing device 130 may then use the label to identify the account when requesting the plurality of subdivisions.

While embodiments are described whereby a first client computing device 110 requests labels from an account holder computing device 130, the methods described herein may bypass either the first client computing device 110 or the account holder computing device 130. For example, the account holder computing device may request the subdivisions from the label tracking system 140 without initially receiving a request from the first client computing device 110.

Additionally or alternatively, the first client computing device 110 may send a request directly to the label tracking system 140 for generation of a plurality of labels without sending the request to the account holder computing device 130. In this implementation, the account holder computing device 130 may perform external transactions, but without an awareness of the generated subdivisions or labels. The implementation which bypasses the account holder computing device 130 is described further herein.

At step 208, the label tracking system 140 generates a plurality of labels and sends the plurality of labels to the account holder computing device 130. For example, the label tracking system 140 may be programmed or configured to generate unique labels in response to a request from the account holder computing device 130 and/or a client computing device. The labels may each comprise a unique string of values which are used to identify the individual subdivisions. The label tracking system 140 may then send the generated labels to the account holder computing device 130.

At step 210, the account holder computing device stores a mapping of subdivisions to labels. For example, if the account holder computing device 130 received a request to generate three subdivisions for a particular account, one for the account owner, one for the account owner's spouse, and one for the account owner's child, the account holder computing device 130 may send a request to the label tracking system 140 to generate three labels. When the account holder computing device 130 receives the three unique labels from the label tracking system 140, the account holder computing device 130 may store data mapping a first label of the three labels to the account owner, a second label of the three labels to the owner's spouse, and a third label of the three labels to the owner's child.

In an embodiment, the request for generation of labels for the subdivisions includes allocation data indicating an amount of the items to assign to each label. For example, the account holder computing device 130 may request generation of two labels for an account, an assignment of $10,000 to a first label of the two labels, and an assignment of $20,000 to a second label of the two labels. The label tracking system 140 may generate the two labels, store data indicating an assignment of $10,000 to one label and $20,000 to the other label, and send the two labels to the account holder computing device 130 with data indicating which label has which assignment. Additionally or alternatively, the account holder computing device 130 may initially request labels without sending allocation information. After the account holder computing device 130 stores the mapping of subdivisions to labels, the account holder computing device 130 may send allocation data to the label tracking system 140 identifying allocations of the items to each of the unique labels. The label tracking system 140 may then store the allocation data indicating the allocations of the items to each of the unique labels.

In an embodiment, the allocation data may allocate less than all of the items in the account and/or more than all of the items in the account. For example, if an account comprises $500,000, the allocation data may allocate only a total of $100,000 and leave the remainder unallocated. As another example, if the account comprises $500,000, the allocation data may allocate $300,000 to a first label and $300,000 to a second label, thereby exceeding a total allocation of $500,000. Such allocations may be useful in allowing multiple users, items, or uses to access the same funds.

The systems and methods described herein improve storage and transfer of items. In the embodiment described in steps 202-210, a set of labels and allocations for the labels are stored at the label tracking system 140 while the account information and mapping of labels to identifiers is stored at the account holder computing device 130. Thus, the label tracking system 140 is able to track transactions between labels while being agnostic as to the source or meanings of the individual labels. Meanwhile, any transfers between labels can be performed by devices authorized to perform transfers which store the mapping of labels to identifiers.

In an embodiment, a client computing device may bypass the account holder computing device 130 and communicate directly with the label tracking system 140. Thus, a client computing device may request the generation of labels from the label tracking system 140 and allocate items stored by the account holder computing device 130 without identifying the subdivisions to the account holder computing device. The client computing device may then store a mapping of the subdivisions to the labels. By allowing allocations or labels to be managed by the client computing device, the account holder computing device 130 can remain agnostic regarding the existence or use of the labels. Thus, private information can be further protected by reducing the number of participants which receive data regarding the account or the subdivisions.

Label Transfers

Referring again to FIG. 2, at step 212, the first client computing device 110 requests a transfer from a first subdivision to a second subdivision from the account holder computing device 130. For example, the first client computing device 110 may send a request to the account holder computing device 130 requesting a transfer from one of the subdivisions to another subdivision. Thus, if a first subdivision corresponds to an account owner and a second subdivision corresponds to a child of the account owner, the account owner may use the client computing device to request a transfer of $500 from the account owner's subdivision to the child's subdivision.

At step 214, the account holder computing device identifies labels corresponding to the first and second subdivisions. The account holder computing device 130 may use the mappings of subdivisions to labels to identify the labels for the requested transfer. For example, in response to receiving a request to perform a transfer of $500 from an account owner's subdivision to a child's subdivision, the account holder computing device 130 may search through the mapping of subdivisions to labels for the account owner's subdivision and the child's subdivision.

At step 216, the account holder computing device 130 requests a transfer from the first label to the second label from the label tracking system 140. The label tracking system 140 may then update the allocation data by decrementing the amount allocated to the first label by the transfer amount and incrementing the amount allocated to the second label by the transfer amount. For example, the account holder computing device 130 may identify label A as corresponding to the account owner's subdivision and label B as corresponding to the child's subdivision. The account holder computing device 130 may send a request to label tracking system 140 that identifies label A as the transferor, label B as the transferee, and 500 as the transfer amount. The label tracking system 140 may then update the allocation data by decrementing label A by 500 and incrementing label B by 500.

In an embodiment, the label tracking system 140 stores a transaction list identifying each requested allocation and/or transfer. When the label tracking system 140 receives a request to transfer a particular number of items between a first label and a second label, the label tracking system 140 may append the transaction to the transaction list. As an example, the label tracking system may add a transaction to the end of the transaction list that indicates a transfer of 500 from label A to label B. The label tracking system 140 may then update the balances corresponding to label A and label B as described above.

In an embodiment, inter-account transfers may bypass the account holder computing device 130 or the client computing device. For example, the account holder computing device 130 may request a transfer between labels without receiving a request from an external source, such as in the case of automated transfers or in cases where the account holder computing device In an embodiment, inter-account transfers can be performed without a request being sent to the account holder computing device 130. For example, a client computing device may store a mapping of subdivisions to labels. When the client computing device receives input specifying a transfer between subdivisions, the client computing device may identify the corresponding labels and send a request to transfer between labels to the label tracking system 140. In this embodiment, the account holder computing device 130 which manages the account may remain ignorant as to transactions between labels. Thus, despite storing data relating to the account, the account holder computing device 130 may not be given information as to how the subdivisions of the account are managed.

External Transfers

The labels, as described herein, may be used to limit external transfers when the account holder computing device 130 is capable of performing the external transfer. This allows limits to be placed on subdivision usages of items stored in the account managed by the account holder computing device 130.

Referring again to FIG. 2, at step 218, the first client computing device 110 requests an external transfer from the first subdivision. For example, the first client computing device 110 may send a request to the account holder computing device which identifies a subdivision and an amount to transfer from the subdivision to an external account. While the request is shown as originating from the first client computing device 110, in other embodiments the request may be received from a third-party computing system. For example, a debit card company may issue a credit card for a particular subdivision. When the debit card is used to initiate a retail transaction, a retail computing device and/or a debit card company computing device may issue a request to the account holder computing device 130 to perform the external transfer. Additionally or alternatively, if the account holder computing device 130 issues the debit card, the account holder computing device 130 may receive the request from a retail computing device when the debit card is used for a transaction.

At step 220, the account holder computing device 130 identifies a label corresponding to the first subdivision. For example, the account holder computing device 130 may identify the first subdivision and a mapped first label in the subdivision to label mapping.

At step 222, the account holder computing device 130 requests allocation data for the first label. For example, the account holder computing device 130 may send a request to the label tracking system 140 for data identifying an amount of the item currently allocated to the first label. In an embodiment, the account holder computing device 130 initially determines whether the account has enough of the item to initiate the transaction. For example, if the transaction request is for an external transfer of $1,000 and the account only holds $500, the account holder computing device 130 may deny the transaction without requesting the allocation data from the label tracking system 140.

At step 224, the label tracking system sends allocation for the first label to the account holder computing device. For example, the label tracking system may identify the first label in the stored allocation data as well as an amount allocated to the first label. The label tracking system may respond to the request for allocation data with the identified amount allocated to the first label.

At step 226, the account holder computing device 130 determines whether the amount allocated to the first label is sufficient for the transaction. For example, the account holder computing device 130 may determine whether the amount allocated to the first label is greater than the amount requested to be transferred. In the scenario depicted in step 226, the account holder computing device 130 determines that the amount allocated to the first label is insufficient for the external transfer and, in response, at step 228, the account holder computing device 130 denies the external transfer request.

If at step 226, the account holder computing device 130 had determined that the amount allocated to the first label was sufficient for the transaction, the account holder computing device 130 may initiate the external transfer. After the external transfer has been completed, the account holder computing device 130 may send data to the label tracking system 140 indicating that a particular amount was transferred out of the first label. The label tracking system 140 may update stored allocation data by decrementing the amount allocated to the first label and/or by decrementing the amount allocated to the first account by the amount of the transfer request.

In an alternative embodiment, the request for an external transfer may initially bypass the account holder computing device. For example, an external computing device, such as a debit card issuer, may receive a request to perform a transfer from a subdivision of an account stored by the account holder computing device 130. The external computing device may identify a label corresponding to the subdivision and request label allocation information from the label tracking system for the label. When the label tracking system 140 returns the amount allocated to the label, the external system may determine whether the amount allocated to the label exceeds the amount of the external transfer. If so, the external system may send a request to the account holder computing device 130 to initiate the external transfer and update the label tracking system once the external transfer has been confirmed. If not, the external system may deny the external transfer request.

Label Types

The systems and methods described herein may be utilized for different types of labels with different types of restrictions and/or uses. The labels discussed in this section provide a non-exclusive list of examples of label types and/or label uses.

In an embodiment, labels can be generated for the purpose of providing access to funds or items to those unable to create an account with the account holder computing device 130. For example, a label may be created as an emergency fund for a child who is not old enough to create a bank account. As another example, an account may be generated for the benefit of an animal that cannot have an account generated in the animal's own name or a type of machine as discussed further herein. Thus, the use of labels for people, animals, machines, or other entities unable to create or own accounts allows for separations of funds or other items between said entities without relying on the structure of an account.

In an embodiment, labels may be generated in concurrence with specific rules for the labels. For example, a label may be generated with a minimum balance rule which restricts external transfers to those which would not reduce the label beyond the minimum balance. As another example, a label may be generated with a maximum transfer rule indicating a maximum amount that can be transferred in a single transaction, temporal rules such as restrictions on transfers based on a time or date, location rules such as restrictions on transfers based on location or location type, and/or any other type of restriction on the use or transfer of items which correspond to the label. The rules may be stored on the client computing device, at the account holder computing device, and/or at an external server computer.

Labels may also be used for sub-accounting of an account. For example, labels may be generated for different uses of funds, such as food purchases, vacation, gifts, necessities, bills, or other uses. The labels for different uses of funds may be associated with specific rules identifying when or where funds from the label can or must be used. For example, a stored rule may indicate that funds for purchases from a restaurant are to be removed from the food label. Additionally or alternatively, a stored rule for the food label may indicate that non-food purchases, such as purchases made for hardware, cannot be taken from the food label. Thus, the rules may enforce specific types of sub-accounting by either forcing external transfers to be allocated to a label or refusing external transfers for funds allocated to a label.

Stored rules may additionally determine allocation of funds that enter the account. For example, the account holder computing device 130 may store a rule that states that funds received from source A are applied to label B. When funds are added to the account from source A, the account holder computing device 130 may request allocation of those funds to label B at the label tracking system 140.

In an embodiment, labels may be limited to specific beneficiaries. The labels for specific beneficiaries may correspond to particular rules limiting external transfers from a label with can have rules limiting where a credit card can be used. For example, a label may be generated for the benefit of an animal, such as a dog. The label may correspond to a rule which specifies types of purchases that can be made using funds allocated to the label, such dog food, veterinary visits, grooming, dog toys, or other pet related expenditures. Additionally or alternatively, a restriction may be placed on locations at which expenditures may be made, such as at veterinary offices, dog groomers, or pet stores. Similar labels may be used for ensuring child support payments are used for the benefit of children or that funds donated to a business are allocated as requested by the donor.

In an embodiment, labels may be limited to specific machines, items, or other particular expenditure. For instance, systems may track costs associated with particular machines, such as cost of usage, cost of energy expenditure, rental costs, ingredient cost, gains from use of an appliance, or other operating/maintenance costs. As a practical example, a metered energy system may determine an amount of power used by a particular appliance and relate that amount of power to an energy cost. A label for an account may correspond to the particular appliance. A stored rule may indicate that all costs for the appliance are to be removed from the label corresponding to the particular appliance. Thus, when the appliance utilizes energy, the cost of energy utilization is either put aside for a later energy bill, an internal transfer is executed for the energy cost, and/or an external transfer is executed for the energy cost. Similarly, for an appliance rental where cost is determined based on use of the appliance, each use of the appliance may correspond to a particular label.

While labels have been generally described with respect to funds, labels may be utilized for any account storing a plurality of at least one type of non-unique item. For example, labels may refer to fake currency, such as video game currency or business specific currency, shares of a specific type of stock, or rights to an amount of physical goods, such as manufactured or grown items. An account may include multiple sets of non-unique items as well as labels for each. For example, a stock portfolio split between ten people may comprise 500 shares of stock A and 500 shares of stock B. The label tracking system 140 may store a set of labels for each of the ten people for stock A and a set of labels for each of the ten people for stock B. The label tracking system 140 may treat the two sets of labels as being from different accounts, thereby removing the possibility of comingling different types of non-unique items.

In an embodiment, data sent to the label tracking system 140 does not identify the type of item being transferred or allocated. For example, the account holder computing device may request generation of two labels and request allocations of 100 to each label without specifying whether the 100 is stock, currency, corn, or any other non-unique item. Thus, the label tracking system 140 may tracking transfers between labels and allocations of values to labels while being agnostic as to the type of item being transferred.

Figure 3:
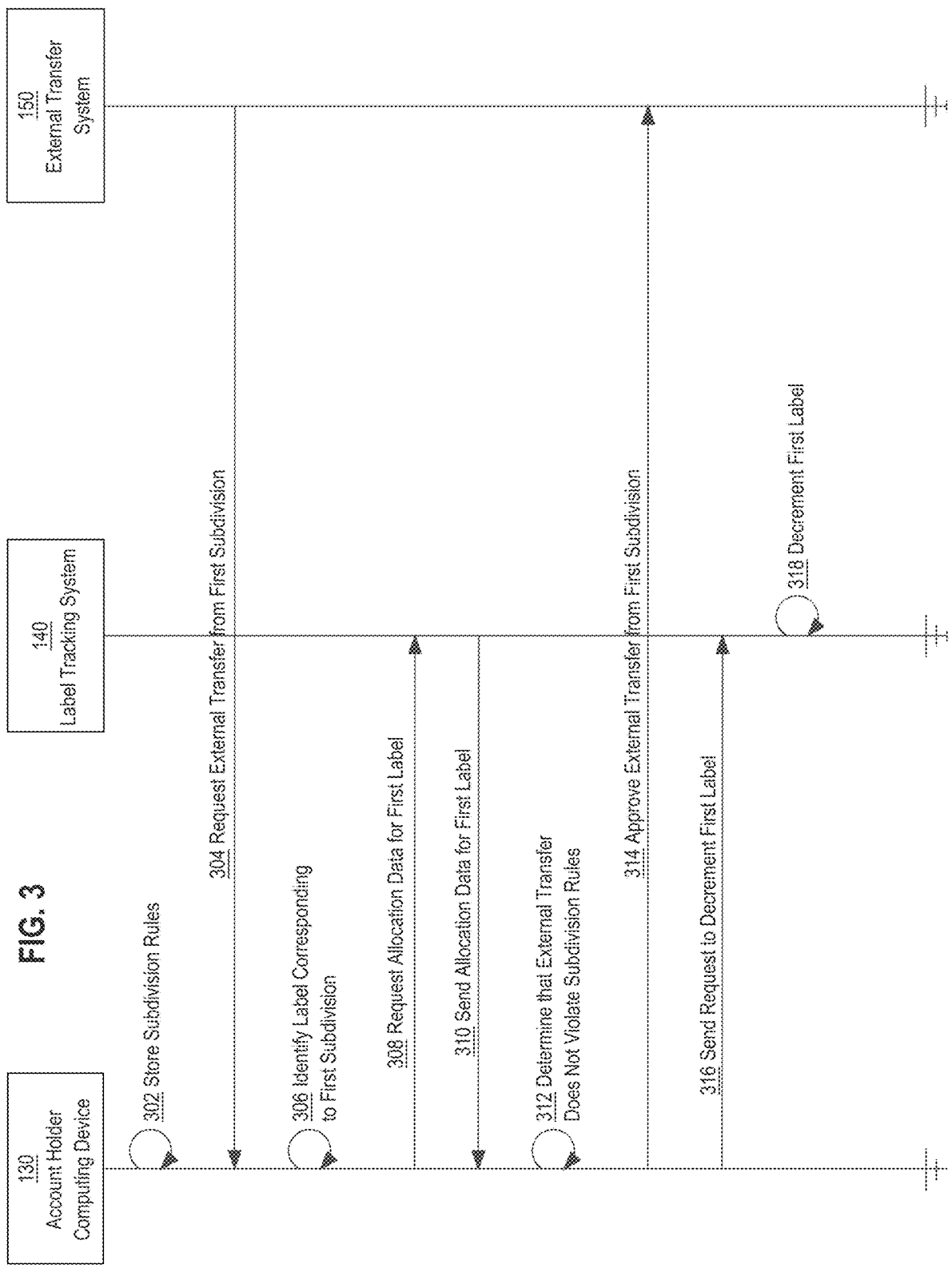
FIG. 3 depicts an example an example method for utilizing rules while providing transfer facilitation.

FIG. 3 depicts an example an example method for utilizing rules while providing transfer facilitation.

At step 302, an account holder computing device stores subdivision rules. The subdivision rules may be requested to be stored by a client computing device and/or an external system. For example, a graphical user interface executing on a client computing device may include options for specifying limitations on a subdivision. The account holder computing device 130, client computing device, or even an external system may store the subdivision rules. FIG. 3 depicts the account holder computing device 130 storing and implementing the subdivision rules for the purpose of providing a clear example.

At step 304, an external transfer system 150 requests an external transfer from a first subdivision. As discussed with respect to FIG. 2, the request may originate from a client computing device, the account holder computing device and/or an external transfer system. In the example of FIG. 3, an external transfer system which does not store the subdivision rules requests an external transfer from the first subdivision, such as in response to use of a debit card, machinery, or transfer request through an online application.

At step 306, the account holder computing device identifies a label corresponding to the first subdivision, such as described herein. For some rules, such as rules restricting the use of particular subdivisions, the account holder computing device may evaluate the rules based on the request prior to identifying a label for the subdivision. For example, if a rule restricts use of a subdivision to a particular retailer, the account holder computing device 130 may determine that the external transfer request was not made at the particular retailer and, in response, deny the transaction.

At step 308, the account holder computing device 130 requests allocation data for the first label, as described with respect to step 222 of FIG. 2. At step 310, the label tracking system 140 sends allocation data for the first label to the account holder computing device 130, as described with respect to step 224 of FIG. 2.

At step 312, the account holder computing device 130 determines whether the external transfer violates any subdivision rules. For example, if a rule for the first subdivision specifies that the first subdivision cannot have less that $50 dollars allocated to it, the account holder computing device 130 may determine whether the external transfer would leave the first subdivision with less than $50 dollars. If the account holder computing device 130 determines that the external transfer request violates one or more subdivision rules, the account holder computing device 130 may deny the transaction.

If the account holder computing device determines that the external transfer does not violate any subdivision rules, the account holder computing device 130 may send data to the external transfer system approving the external transfer. The external transfer system and/or the account holder computing device may initiate an external transfer from the stored account.

At step 314, the account holder computing device sends a request to the label tracking system to decrement the first label by the amount of the external transfer. At step 316, the label tracking system decrements an amount allocated to the first label by the amount of the external transfer. In an embodiment, the label tracking system 140 may also store transaction data identifying that an external transfer occurred from the first label for the decremented amount.

Multiple Label Transactions

In an embodiment, labels can be used to execute transactions without moving funds or items between accounts, thereby limiting both transaction time and difficulty in completing a transaction. For purposes of the example, the label tracking system may store labels for two different types of non-unique items, such as currency and stock. The labels may correspond to accounts stored by one or more account holder computing devices, the accounts being each split into a plurality of subdivisions corresponding to a plurality of different users.

For a multiple label transaction, the method of FIG. 2 may be performed with two sets of labels. For instance, if user A wishes to purchase 50 shares of a stock from user B for $500, a financial system may first identify labels for both user A and user B relating to an account holding currency while a stock system may identify labels for both user A and user B relating to stock. Both systems may request allocation data from the label tracking system 140 to determine whether user A can transfer $500 and whether user B can transfer 50 shares of the stock. If the systems determine that both transactions can occur, the systems may send a request to the label tracking system to decrement the currency label for user A by 500, increment the currency label for user B by 500, decrement the stock label for user B by 50, and increment the stock label for user A by 50. From the perspective of the label tracking system, a first label sent 500 to a second label and a third label sent 50 to a fourth label. Thus, the label tracking system is able to track allocations without knowledge of the purpose or type of transaction. In an embodiment, the financial system and the stock system are the same system.

Software Access to Balance Allocation

Figure 5:
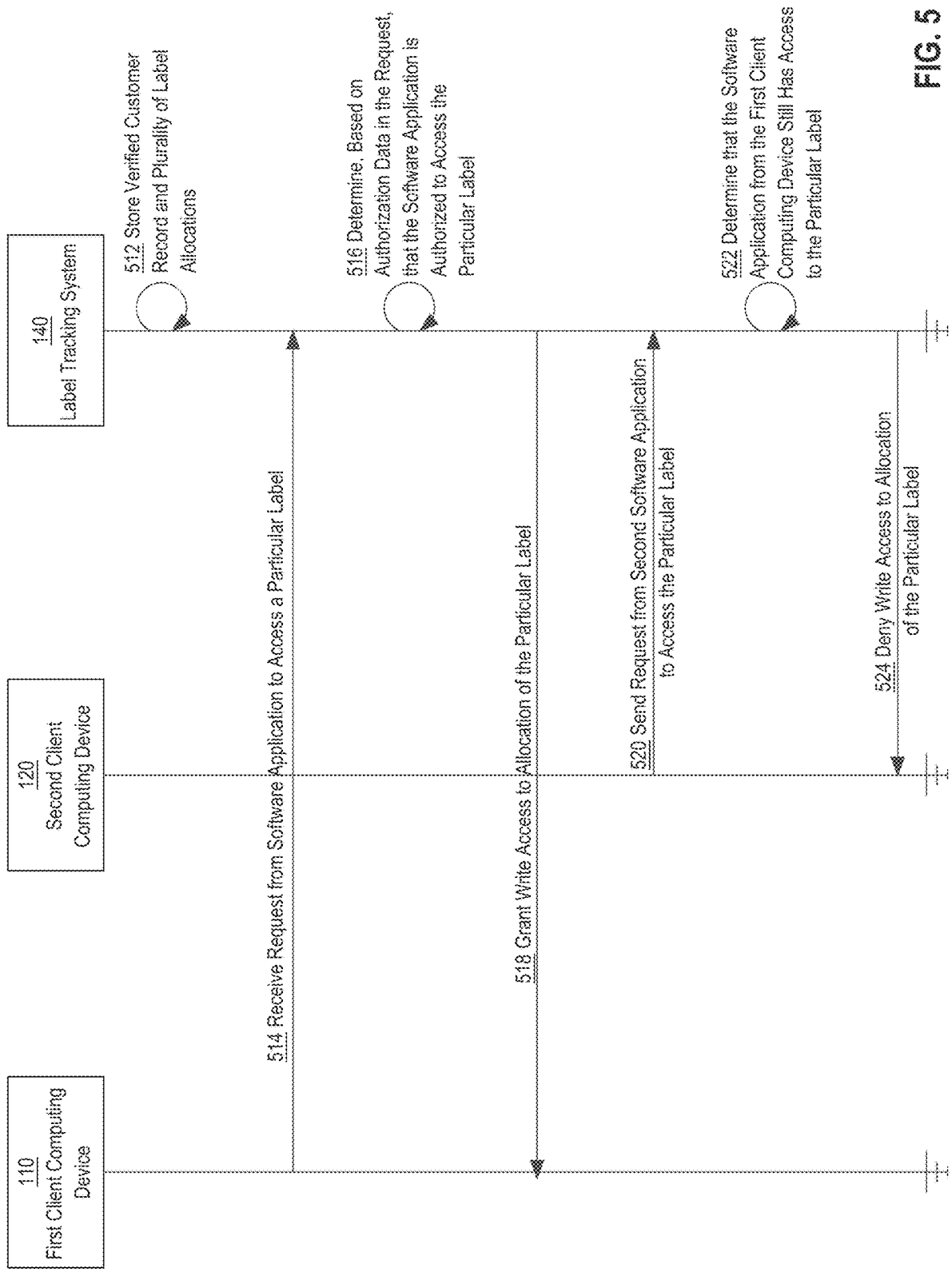
FIG. 5 depicts an example of a method for providing label access to software applications.

FIG. 5 depicts an example of a method for providing label access to software applications. The method of FIG. 5 allows software applications to manage items in an account owned by the provider of the software applications. Thus, identity verification of a user owning items in an account is not required for the software application to allocate items from the account. Such methods may additionally be used to perform external transfers as described herein.

At step 512, a verified customer record and a plurality of label allocations are stored at label tracking system 140. For example, label tracking system 140 may store a verified customer record (VCR) 143 for an owner of an account managed by account holder computing device 130. The label tracking system 140 may receive a request to generate label allocations such as described above with respect to FIG. 2. While FIG. 2 depicts first computing device 110 as the device requesting the label allocation and FIG. 5 depicts first client computing device 110 as requesting access to subdivisions, in an embodiment these actions are performed by different computing devices. For example, a VCR owner computing device may request the subdivision of the labels and then grant access to the labels to first client computing device 110 and/or second client computing device 120. When the labels are created, the VCR owner computing device may provide and/or be provided with authentication data for each label. Additionally or alternatively, the VCR owner computing device 110 may designate a client computing device and/or account to receive the authentication data and/or provide authentication data for a label.

At step 514, a request to access a particular label is sent from a software application executing on first client computing device 110 to label tracking system 140. In an embodiment, the request to access the particular label includes authentication information for the particular label. The authentication information may be a public/private key pair, encrypted token, or other means of authenticating that the software application has been granted access to the particular label. The authentication information may be stored on the first client computing device 110, input by a user of the first client computing device, retrieved from a data repository corresponding to the software application, and/or retrieved from a third-party system, such as a password manager. As an example, a provider of the software application may store authentication data for a plurality of labels.

In an embodiment, the request to access the particular label identifies an instance of the software application executing on the first client computing device 110 that is requesting the access to the particular label. For example, a browser executing on the first client computing device 110 may include multiple sessions, including an online gaming session and a shopping session. The request to access the particular label may identify that a particular session, such as the online gaming session, is requesting access to the particular label. Individual sessions may additionally have access to different authentication data. For example, the online gaming session may have access to a public/private key/value pair for a first label while the shopping session has access to a public/private key/value pair for a second label.

In an embodiment, the request and/or authentication information is sent by a system other than the first client computing device, such as an application server corresponding to the software application. For example, the application server may create and/or receive the authentication data for an account of the first client computing device which is stored by the application server. When the application server determines that the first client computing device has accessed the software application, such as through receiving authentication information from the first client computing device for the software application, the application server may send the authentication data for the particular label to either the software application executing on the first client computing device and/or to the label tracking system on behalf of the software application executing on the first client computing device.

At step 516, the label tracking system 140 determines, based on authentication data in the request, that the software application is authorized to access the particular label. For example, the label tracking system 140 may authenticate the authentication data received with the request using any authentication scheme, such as comparison of a received SSH public/private key/value pair to key/value pairs stored in a data repository.

In an embodiment, the label tracking system 140 restricts access to a label while another application or application instance is accessing the label. Thus, determining that the software application is authorized to access the particular label may further comprise determining that the label is not currently being accessed by a different software application and/or by a different instance of the software application. For example, the label tracking system 140 may receive, with requests to access the particular label, data identifying a time period during which a software application will access the particular label. As another example, the label tracking system 140 may set a period of time that a software application may access the label before needing to be reauthorized, such as one hour. In further examples, the label tracking system 140 may continue providing access to the label to a software application until an indication is received from the software application that the label is no longer being accessed, such as through input signing off the account, automatic sign-off due to inactivity, or a remote sign-off from another device. The label tracking system 140 may store data indicating when a label is unavailable and may refer to the stored data when receiving a request to access the label.

At step 518, the label tracking system 140 grants the first client computing device 110 write access to allocations of the particular label. For example, the label tracking system 140 may store data indicating that an instance of the software application has write access to allocations of the particular label and/or may send a response to the first client computing device 110 indicating that the software application has been granted access to allocations of the particular label. When the label tracking system 140 receives a request from the software application to transfer items from the particular label, the label tracking system 140 may determine, from stored data, that the instance of the software application has write access to the label and, in response to determining that the instance of the software application has write access to the label, may perform the transfer as described further herein.

By granting write access to the label to a software application, the label tracking system 140 is able to provide capabilities to a software application that were not previously available. Without being granted actual ownership of the items in the account, the software application is able to initiate transfers of the items to other labels or to other accounts. Additionally, by using authentication data granted to a specific software application and/or session of a specific software application, the label tracking system 140 is able to provide a means for anonymized transfer of items from individuals without requiring a grant of ownership of the items to the individuals, thereby providing increased security for online transactions as personal data and/or financial data does not need to be granted to the label tracking system 140 to authorize the transfer from the label.

Steps 520-524 describe a method by which the label tracking system 140 responds to a second request to access the particular label from a second software application executing on a second client computing device 120. At step 520, a request to access the particular label is sent from a second software application executing on a second client computing device 120. The request from the second software application executing on the second client computing device 120 may include the same authentication data as the request sent from the software application executing on the first client computing device. For example, both software applications may have access to the same key/value pair through user input, storage on the client computing devices, or from an external computing device.

At step 522, the label tracking system 140 determines that the software application from the first client computing device still has access to the particular label. For example, the label tracking system 140 may compare a time of the second request to access the particular label with stored data indicating when the application from the first client computing device has exclusive access to the particular label. If the time of the second request is within the range of time when the application from the first client computing device has exclusive access to the particular label, the label tracking system 140 may determine that the software application from the first client computing device still has access to the particular label. Additionally or alternatively, the label tracking system may store a value indicating whether or not the label is currently being used and may determine that the first client computing device still has access to the label based on the stored value.

At step 524, the label tracking system denies the second client computing device 120 write access to allocations of the particular label. For instance, the label tracking system 140 may be configured to only allow one application and/or one instance of an application to access allocations from a particular access at a time. Thus, the label tracking system 140 may, in response to determining that the first client computing device has exclusive access to the label, send a response to the second client computing device denying access to allocations of the particular label. In this way, the label tracking system 140 ensures data integrity in the allocation values. For example, the label tracking system 140 may provide label balance information to a software application granting the software application access to the label. If another application was also granted access to the label, it would be difficult to ensure that the first software application is able to accurately make allocations of the balance of the label.

While steps 520-524 refer to a second software application and second client computing device, a similar method may be performed when a request is received from the same software application executing on a second client computing device, a second software application executing on the first client computing device, and/or a second instance of the software application executing on the first client computing device.

Software Application External Transfers

Internal transfers between labels may be performed by software applications which have been granted access to labels in the same ways as described herein. As no change occurs in the balance of the account, a software application may request transfer of item allocations from the label to which the software application has access to a different label, such as by providing a label identifier and a transfer amount to the label tracking system 140. The label tracking system 140 may then update stored label allocation data by decrementing a value for the sending label by the amount in the transfer request and incrementing a value for the receiving label by the amount in the transfer request.

External transfers, such as transfers from the label to an account that is different from the account corresponding to the VCR of the label, are a bit more complex as the software application has access to only the label allocations and not to any of the actual items. For external transfers, the label tracking system may communicate with an account holder computing device on behalf of an account owner. For example, the label tracking system 140 may receive a request from the software application to transfer items to an external account, the request comprising a transfer amount and an identifier of the external account, such as an account number and/or routing number. The label tracking system 140 may allocate the transfer amount to the VCR, such as by decrementing the balance of the label by the transfer amount and/or incrementing a value corresponding to unallocated items in the VCR by the transfer amount. The label tracking system 140 may then send a request to the account holder computing device 130 to transfer items from the account corresponding to the VCR to the external account on behalf of the account owner. The label tracking system 140 may then decrement the balance of the VCR by the transfer amount.

In an embodiment, the label tracking system 140 receives a request to transfer from a label of a first VCR to a label of a second VCR from a software application. The label tracking system 140 may first allocate items in the transfer request to the first VCR and send request to the account holder computing device 130 to transfer items from an account corresponding to the first VCR to an account corresponding to the second VCR using the methods described herein. The label tracking system 140 may then decrement the first VCR balance by the transfer amount and increment the second VCR by the transfer amount. The label tracking system 140 may then transfer from the VCR to the second label, such as by incrementing the balance of the second label by the transfer amount and/or decrementing the balance of the VCR by the transfer amount.

Example Software Access Implementations

The label architecture coupled with the access to a label from a software application may provide multiple benefits to computing systems and to electronic transfer systems. In an implementation, the label architecture coupled with software application access allows an application owner to provide items to anonymous users without requiring download of a specialized application or providing of personal information. As an example, an application owner can provide access to funds that can be spent within the label architecture to a user without requiring personal information of the user. As long as an application session has access to the authentication information, the application can request transfers of funds from that label.

An implementation may be used to grant access to funds to entities that cannot legally own funds. For example, a machine may be granted access to funds so that the machine can perform purchases or can pay for usage of materials and/or electricity. A software application executing on the machine may provided with authentication information for a label corresponding to the machine. When the machine, during its operation, requires access to a resource, the machine can request a transfer from the label of the machine to a label of the resource provider without requiring user input or direct ownership of the funds in the label.

Implementations may also be utilized to increase the speed of transactions. By granting access to the label to an application instance, the label tracking system provides capabilities for faster initiation and execution of transactions. Thus, a machine learning system operating on a client computing device may determine an optimal time to perform a transaction based on incoming data and request a transaction almost instantaneously through an application instance which has access to a particular label.

Implementations may be utilized for any type of item. While funds are generally discussed in the specification, implementations may also be utilized with virtual currency, such as cryptocurrency, and/or to represent other types of transfers, such as stock transfers or other assets comprising units of ownership interest in an entity. Thus, an ecosystem including multiple label systems, one for funds and one or more for stocks, can provide increased speed in trading as prices can be set by computing systems and trades can be initiated by software applications with access to labels. As stock trading can often be heavily affected by even a slight increase in speed, implementations which provide software applications the capability of initiating transactions using stored or accessed authentication information can greatly improve such systems.

Benefits of Certain Embodiments

The systems and methods described herein provide increased security for transactions made using computing systems over a network by maintaining anonymity of the transfer participants from the system storing the allocations while maintaining anonymity of account allocations from the holder of the account. By bifurcating the allocation data from the subdivision information, no single system can act as a single point of security fault. The account holder computing device can identify the subdivisions, but is unable to state the values associated with each subdivision. Meanwhile, the label tracking system is able to identify allocations without being able to state what is being allocated and what the stored labels correspond to. In some embodiments, a user is able to perform transfers while completely bypassing the account holder computing device. Thus, the management of the account may remain the same while transfers are performed at the subdivision level through the label tracking system.

The systems and methods described herein additionally can be sued to eliminate transaction costs and reduce delays in transfers between sources while providing a rules-based system that can limit the usage of items stored in a subdivision. Thus, an account holder may be able to transfer funds a long distance between two subdivisions by changing the label allocations without needing to physically move the funds. This eliminates the cost of performing transactions across long distances and the delays in the transfer, as the receiving subdivision will have access to the funds in the time it takes the label tracking system to update the label values. The rules further allow for bifurcation of an account in a manner that restricts the usage of items transferred, thereby providing security to the transferor.

The systems and methods described herein provide a practical application of a funds transfer by bifurcating the storage of label allocations from the storage of subdivision to label mappings. Additionally, the systems and methods described herein provide a practical application by allowing funds transfers to be performed through label allocations at a separate system instead of exposing that data to the account manager. This practical application speeds up transfers, provides anonymity, and reduces a number of required accounts for separate purposes.

Software application access implementations further provide benefits in transaction speed and security. In terms of security, by granting label access to software applications using the methods described herein, a system can grant access of items to users without storing any sensitive information and without linking to a bank account or requiring user authentication. In terms of speed, the systems described herein allow software applications to initiate transactions in a manner that was not previously available, thereby increasing the speed of the transactions. Finally, the implementations described herein provide access to devices that otherwise would not have been able to perform transactions, thereby benefitting the machines themselves.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
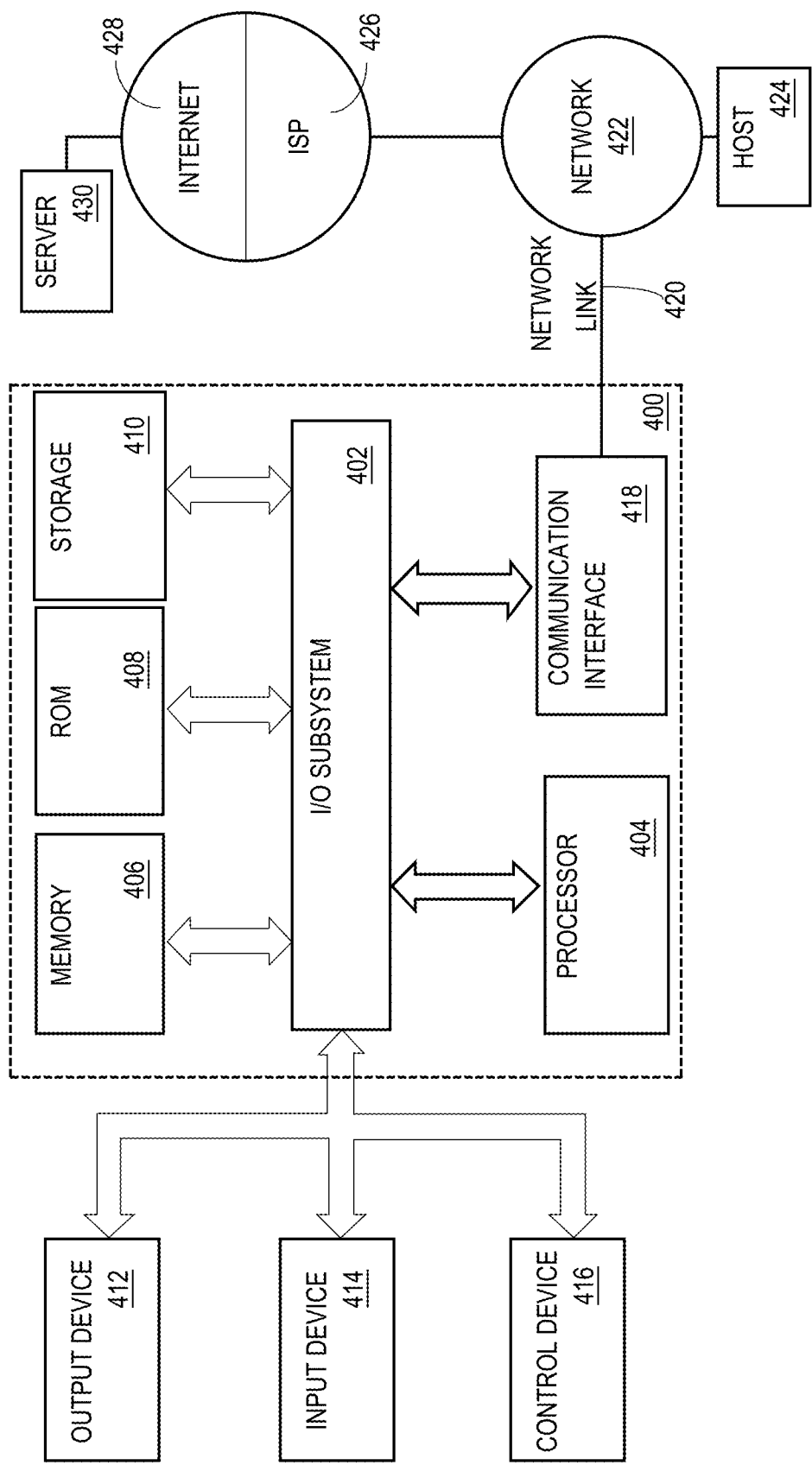
FIG. 4 is a block diagram that illustrates a computer system upon which an embodiment may be implemented.

For example, FIG. 4 is a block diagram that illustrates a computer system 400 upon which an embodiment may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A label tracking system for increasing security in situations where users who do not own an account require access to allocation of a subset of items in the account comprising:
    one or more processors;
    a memory storing instructions which, when executed by the one or more processors,
        perform the steps of:
        storing, in one or more non-volatile storage media, a verified customer record comprising:
            an identifier of an account owner, and
            data describing items in an account of the account owner;
        storing, in the one or more non-volatile storage media, for the verified customer record, data identifying a plurality of labels, each of the plurality of labels comprising an allocation of items in the account;
        assigning to a particular label of the plurality of labels, label-specific authentication data;
        receiving from a first software application executing on a first client computing device, a first request to access the particular label of the plurality of labels;
        determining whether the first request comprises the label-specific authentication data;
        in response to determining that the first request comprises the label-specific authentication data, determining that the first software application is authorized to access the particular label of the plurality of labels without being authorized to access other labels of the plurality of labels;
        based on determining that the first software application is authorized to access the particular label, granting the first software application exclusive access to allocate items from the particular label of the plurality of labels;
        while the first software application has exclusive access to allocate items from the particular label of the plurality of labels, receiving a second request to access the particular label of the plurality of labels from a second software application executing on a second client computing device;
        wherein the second request includes the label-specific authentication data for the particular label;
        based on the first software application having exclusive access to allocate items from the particular label of the plurality of labels, denying the second software application access to allocate items from the particular label of the plurality of labels.

2. The system of claim 1,
    wherein the first request to access the particular label further comprises data identifying a period of time;
    wherein granting the first software application exclusive access to allocate items from the particular label comprises granting the exclusive access for the period of time.

3. The system of claim 1, wherein the first software application is a browser instance.

4. The system of claim 1, wherein the first client computing device comprises a machine which sends the first request to allocate the items without user input.

5. The system of claim 1, wherein the label-specific authentication data comprises a public/private key/value pair.

6. The system of claim 1, wherein the instructions, when executed by the one or more processors, further perform the steps of:
    while the first software application has exclusive access to the particular label, receiving a particular request to allocate one or more items from the particular label to a second label of a second verified customer record;
    allocating the one or more items from the particular label to the verified customer record;
    transferring the one or more items from the account of the verified customer record to a second account of the second verified customer record;
    allocating the one or more items from the second verified customer record to the second label.

7. The system of claim 1, wherein the instructions, when executed by the one or more processors, further perform steps of:
    while the first software application has exclusive access to the particular label, receiving a particular request to allocate one or more items from the particular label to an external account;
    allocating the one or more items from the particular label to the verified customer record;
    generating an external customer record for the external account;
    allocating the one or more items from the verified customer record to the external customer record;
    causing transferring of the one or more items from the account of the verified customer record to the external account.

8. The system of claim 7, wherein the one or more items comprise one or more units of a virtual currency.

9. The system of claim 7, wherein the one or more items comprise one or more units of ownership interest in an entity.

10. A method for increasing security in situations where users who do not own an account require access to allocation of a subset of items in the account, the method comprising:
    storing, in one or more non-volatile storage media, by at least one processor of a label tracking system, a verified customer record comprising:
        an identifier of an account owner, and
        data describing items in an account of the account owner;

storing, in the one or more non-volatile storage media, by at least one processor of the label tracking system, for the verified customer record, data identifying a plurality of labels, each of the plurality of labels comprising an allocation of items in the account;

assigning, by at least one processor of the label tracking system, to a particular label of the plurality of labels, label-specific authentication data;

receiving, by at least one processor of the label tracking system, from a first software application executing on a first client computing device, a first request to access the particular label of the plurality of labels;

determining, by at least one processor of the label tracking system, whether the first request comprises the label-specific authentication data;

in response to determining, by at least one processor of the label tracking system, that the first request comprises the label-specific authentication data, determining, by at least one processor of the label tracking system, that the first software application is authorized to access the particular label of the plurality of labels without being authorized to access other labels of the plurality of labels;

based on determining that the first software application is authorized to access the particular label, at least one processor of the label tracking system granting the first software application exclusive access to allocate items from the particular label of the plurality of labels;

while the first software application has exclusive access to allocate items from the particular label of the plurality of labels, at least one processor of the label tracking system receiving a second request to access the particular label of the plurality of labels from a second software application executing on a second client computing device;

wherein the second request includes the label-specific authentication data for the particular label;

based on the first software application having exclusive access to allocate items from the particular label of the plurality of labels, at least one processor of the label tracking system denying the second software application access to allocate items from the particular label of the plurality of labels.

11. The method of claim 10,
wherein the first request to access the particular label further comprises data identifying a period of time;
wherein granting the first software application exclusive access to allocate items from the particular label comprises granting the exclusive access for the period of time.

12. The method of claim 10, wherein the first software application is a browser instance.

13. The method of claim 10, wherein the first client computing device comprises a machine which sends the first request to allocate the items without user input.

14. The method of claim 10, wherein the label-specific authentication data comprises a public/private key/value pair.

15. The method of claim 10, further comprising:
while the first software application has exclusive access to the particular label, at least one processor of the label tracking system receiving a particular request to allocate one or more items from the particular label to a second label of a second verified customer record;
allocating, by at least one processor of the label tracking system, the one or more items from the particular label to the verified customer record;
transferring, by at least one processor of the label tracking system, the one or more items from the account of the verified customer record to a second account of the second verified customer record;
allocating, by at least one processor of the label tracking system, the one or more items from the second verified customer record to the second label.

16. The method of claim 10, further comprising:
while the first software application has exclusive access to the particular label, at least one processor of the label tracking system receiving a particular request to allocate one or more items from the particular label to an external account;
allocating, by at least one processor of the label tracking system, the one or more items from the particular label to the verified customer record;
generating, by at least one processor of the label tracking system, an external customer record for the external account;
allocating, by at least one processor of the label tracking system, the one or more items from the verified customer record to the external customer record;
at least one processor of the label tracking system causing transferring of the one or more items from the account of the verified customer record to the external account.

17. The method of claim 16, wherein the one or more items comprise one or more units of a virtual currency.

18. The method of claim 16, wherein the one or more items comprise one or more units of ownership interest in an entity.

* * * * *